(12) United States Patent
Heitmann et al.

(10) Patent No.: US 10,909,881 B2
(45) Date of Patent: Feb. 2, 2021

(54) SYSTEMS, DEVICES, AND METHODS INCLUDING CONNECTED STYLING TOOLS

(71) Applicant: L'OREAL, Paris (FR)

(72) Inventors: Melissa Heitmann, New York, NY (US); Richard Rivas, Long Island City, NY (US); Lea Koussoulis, New York, NY (US); Steve Diforio, New York, NY (US); Shane Wolf, Kintnersville, PA (US); Julien Chardon, New York, NY (US); Guive Balooch, New York, NY (US); Edouard Messager, Saint-Ouen (FR)

(73) Assignee: L'OREAL, Paris (FR)

( * ) Notice: Subject to any disclaimer, the term of this patent is extended or adjusted under 35 U.S.C. 154(b) by 493 days.

(21) Appl. No.: 15/701,905

(22) Filed: Sep. 12, 2017

(65) Prior Publication Data
US 2018/0075776 A1   Mar. 15, 2018

Related U.S. Application Data

(60) Provisional application No. 62/394,001, filed on Sep. 13, 2016.

(51) Int. Cl.
*A45D 1/28* (2006.01)
*G09B 19/24* (2006.01)
(Continued)

(52) U.S. Cl.
CPC .............. *G09B 19/24* (2013.01); *A45D 1/04* (2013.01); *A45D 1/16* (2013.01); *A45D 1/28* (2013.01); *A45D 2/001* (2013.01); *A45D 2/40* (2013.01); *A45D 6/00* (2013.01); *A45D 20/10* (2013.01); *A45D 20/12* (2013.01); *A45D 44/005* (2013.01); *G09B 5/02* (2013.01); *G09B 19/0076* (2013.01); *A45D 2044/007* (2013.01); *H04B 7/26* (2013.01)

(58) Field of Classification Search
CPC .............. A45D 2044/007; A45D 20/52; A45D 20/525; A45D 20/00; A45D 20/02; A45D 20/08; A45D 20/10; A45D 44/005; A45D 2007/007; A45D 2044/005; A45D 2007/002; A45D 2200/25; A45D 7/00
See application file for complete search history.

(56) References Cited

U.S. PATENT DOCUMENTS 10,021,952 B2 *   7/2018   Goldman ................ A45D 20/12
2012/0312320 A1 * 12/2012  Humphreys ............. A45D 1/28
                                                     132/211
(Continued)

FOREIGN PATENT DOCUMENTS

WO      WO2017045719        *   9/2015   ............... A45D 1/00

*Primary Examiner* — Rachel R Steitz
*Assistant Examiner* — Brianne E Kalach
(74) *Attorney, Agent, or Firm* — Oblon, McClelland, Maier & Neustadt, L.L.P.

(57) ABSTRACT

A system is provided including a styling tool configured to treat or shape a user's hair, and a client device configured to communicate with the styling tool and provide feedback to the user regarding a user's usage of the styling tool. The client device is configured to receive input information from the user regarding a desired result to be achieved using the styling tool, and to output guidance information on a method of using the styling tool to achieve the desired result.

20 Claims, 3 Drawing Sheets

(51) Int. Cl.
*A45D 44/00* (2006.01)
*A45D 1/04* (2006.01)
*A45D 2/00* (2006.01)
*A45D 6/00* (2006.01)
*A45D 20/12* (2006.01)
*G09B 5/02* (2006.01)
*A45D 2/40* (2006.01)
*A45D 1/16* (2006.01)
*G09B 19/00* (2006.01)
*A45D 20/10* (2006.01)
*H04B 7/26* (2006.01)

(56) References Cited

U.S. PATENT DOCUMENTS

2015/0342515 A1\* 12/2015 Hutchings .............. A46B 9/023
　　　　　　　　　　　　　　　　　　　　　132/200
2016/0357578 A1\* 12/2016 Kim .................... A45D 44/005

\* cited by examiner

SYSTEMS, DEVICES, AND METHODS INCLUDING CONNECTED STYLING TOOLS

CROSS REFERENCE TO RELATED APPLICATIONS

The present application claims the benefit of priority from U.S. Provisional Application No. 62/394,001, filed Sep. 13, 2016, the entire contents of which is hereby incorporated herein by reference.

BACKGROUND

Tools are now a major part of the styling landscape. The styling category is rapidly changing, driven by the increasing penetration of professional styling tools that are now used by 60% of US women at home to create styles together with their stylers. Even with more and more efficient tools in hand, women are still struggling to achieve salon quality styles at home. We can clearly see online that the searches and conversations are heavily revolving around "how to achieve the looks" and that the most discussed tools are the ones that are most difficult to use (straighteners and curlers more discussed than blow-dryers). Therefore, the following challenges are apparent: 1—Bring our hairdresser's know-whow to women's fingertips and ensure that they successfully achieve their desired look. 2—Enhance women's heat-style experience and look by pairing tools with professional styling formulas (to prep, protect and section the hair before they heat-style/to enhance shape creation and hold while they heat-style/to lock, extend and refresh style after they heat-style).

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present embodiments are directed to a smart, connected styling tool that teaches a user how to achieve any style at home. In an embodiment, the system connects a styling tool with a client device. In an embodiment, the client device receives inputs on the user's needs provides feedback on how to achieve a certain look, and can correct the user's technique while using the styling tool.

Figure 1A:
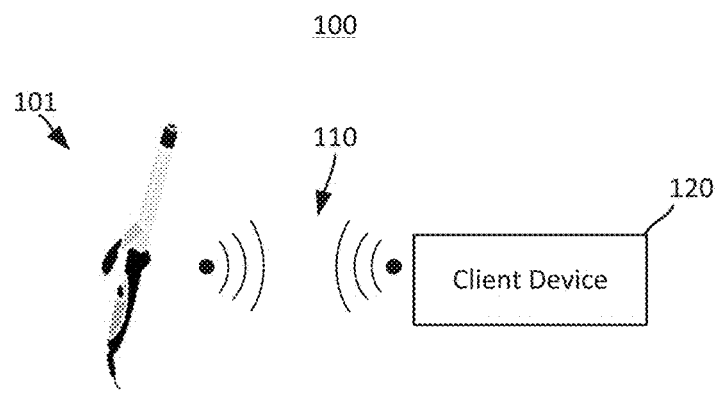
FIG. 1A depicts a system according to an embodiment that includes a styling tool and a client device.

FIG. 1A shows a system 100 that includes a styling tool 101 and a client device 120. In an embodiment, the styling tool 101 is in communication with the client device 120 with a wireless signal 110. In an embodiment, the client device 120 is configured to operate a software application or set of software modules to receive and send communications from and to the styling tool 101. In an example, the software application can send a protocol or target profile to the styling tool 101, as well as receive data from the styling tool 101 to track the usage in realtime.

Figure 1B:
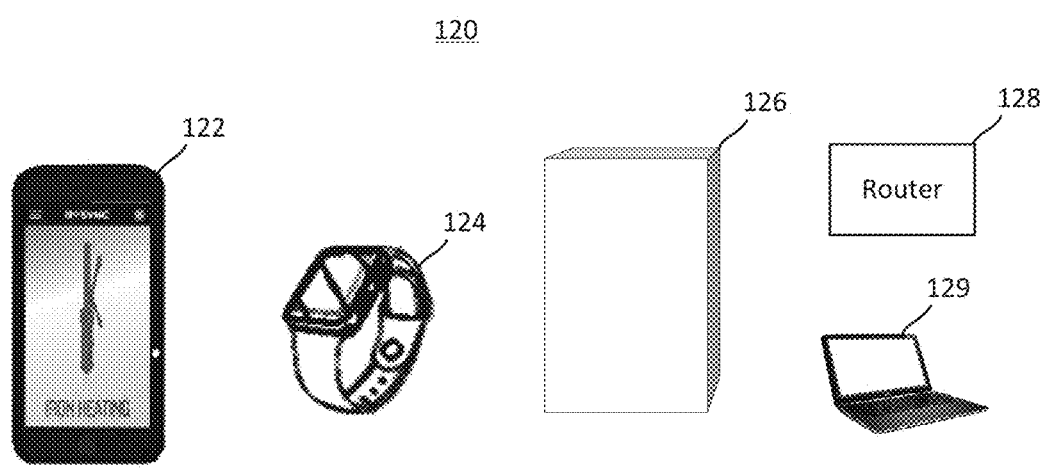
FIG. 1B depicts examples of client devices according to embodiments.

The styling tool 101 may be a curling iron, a hair straightener (straightening iron), or hair waving tool (waving iron), or it could be a combination of 2 or more of these types of devices as is known in the art, such as a 3 in 1 tool that is a combination of a straightening iron, curling iron and waving iron. In an embodiment, the styling tool is a type of device used to style a user's hair, such as a hair dryer. FIG. 1B shows different examples of the client devices 120 including, a mobile device 122, a wearable electronic 124, a television or magic mirror 126, a network router 128, and a personal computer 129.

The wireless signal 110 can be any appropriate signal such as an electromagnetic signal including WIFI, Bluetooth, near-field, or any other signal such as optical, and acoustic. Each client device, including the appliance, may communicate with each other through an internet connection via an 802.11 wireless connection to a wireless internet access point, or a physical connection to the internet access point, such as through an Ethernet interface. Each connected device is capable of performing wireless communication with other devices, such as through a Bluetooth connection or other wireless means as well.

Figure 1C:
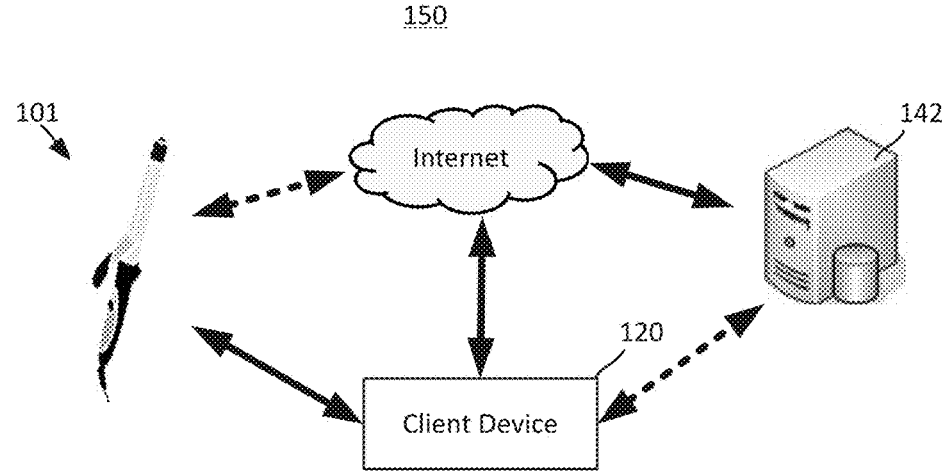
FIG. 1C depicts an alternative system according to an embodiment.

FIG. 1C is a diagram representing an example of a system 150 to promote optimum performance of a styling tool 101, according to one example. The system 150 includes at least the styling tool and the client device. Optionally, the system 150 may further include one or more external servers 142 which are implemented as part of a cloud-computing environment and in communication with the system 150 through the Internet. The one or more external servers 142 can store user data, products such as brushheads and formulations, protocols and routines, tutorials, as well as other $3^{rd}$ party services according to an example.

Figure 2:
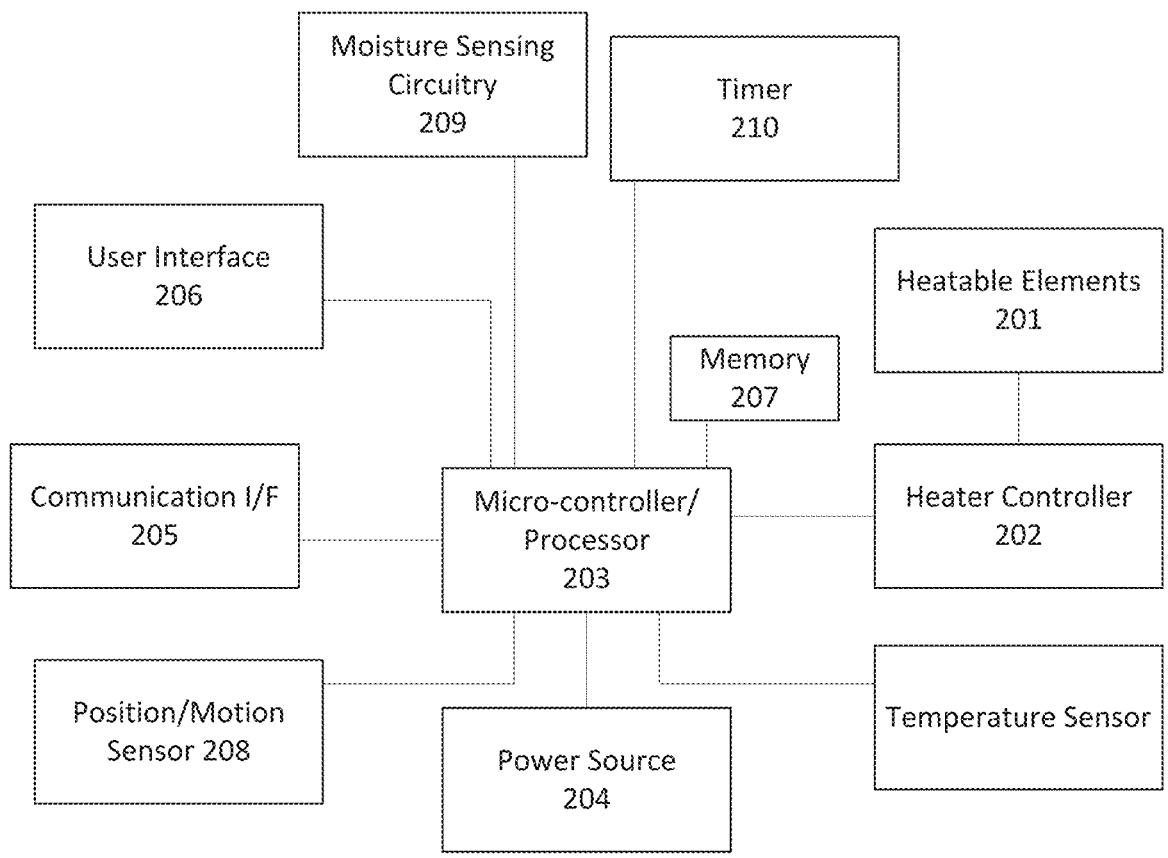
FIG. 2 depicts an electrical/hardware block diagram of the styling tool according to an embodiment

FIG. 2 shows a diagram of the electrical block diagram of the hardware components of the styling tool 101. A heatable element 201 is controlled by means of heater controller 202, which is controlled by a processor 203. The power from the power source 204 is also controlled by the processor 203. Thus, it is possible to increase or reduce the power of the heatable element when the temperature or other measurement (e.g., moistness) of the hair tool or hair decreases or increases in order to prevent the hair from becoming too dry or from being scorched/damaged. It will be appreciated that the electrical block diagram may be modified to adapt to other configurations in accordance with the principles disclosed herein. In an example, the communication interface (I/F) 205 can include circuitry and hardware for communication with a client device 120. The communication interface 205 may include a network controller such as BCM43342 Wi-Fi, Frequency Modulation, and Bluetooth combo chip from Broadcom, for interfacing with a network. The hardware can be designed for reduced size. For example, the processor 203 may be a CPU as understood in the art. For example, the processor may be an APL0778 from Apple Inc., or may be other processor types that would be recognized by one of ordinary skill in the art. Alternatively, the CPU may be implemented on an FPGA, ASIC, PLD or using discrete logic circuits, as one of ordinary skill in the art would recognize. Further, the CPU may be implemented as multiple processors cooperatively working in parallel to perform the instructions of the inventive processes described above. The client device may also have similar circuitry and hardware as described above.

In an embodiment, the styling tool includes a user interface 206, which may be in the form of input buttons on the housing of the tool, or it may be in the form of a contact-sensitive display, such as a capacitive or resistive touch screen display.

In an embodiment, the styling tool includes a memory 207 that stores software for controlling the styling tool, or for storing user data or other information.

In an embodiment, the styling tool includes a position/motion sensor 208 that can detect an orientation of the styling too as it is being held by the user, and it may also detect movements and motion paths of the styling tool as well. In an embodiment, the position/motion sensor is a combination of a geomagnetic sensor and an acceleration sensor. For example, a 3-axis geomagnetic sensor ascertains the direction of geomagnetism, or in other words a geomagnetic vector Vt, given the current orientation of (the housing of) the styling tool housing the 3-axis geomagnetic sensor. A 3-axis acceleration sensor ascertains the direction of gravity, or in other words a gravity vector G, given the current orientation of (the housing of) the styling tool housing the 3-axis acceleration sensor in a still state. The gravity vector G matches the downward vertical direction. The gravity vector G likewise may be decomposed into Xs, Ys, and Zs axis components.

Alternatively, or additionally, a gyroscope may be used which is a sensor that detects angular velocity about the three axes Xs, Zs, and Ys (roll, pitch, and yaw), and is able to detect the rotation of an object. In addition, the geomagnetic sensor is able to ascertain the heading in which the object faces, based on a geomagnetic vector as discussed earlier.

The styling tool may include moisture sensing circuitry 209 to detect the dryness of the user's hair. The moisture sensing circuitry may be similar to that described in U.S. application Ser. No. 13/112,533 (US Pub. No. 2012/0291797A1), incorporated herein by reference. Alternatively, the moisture sensing circuitry may rely on a hall-effect sensor which detects changes in a magnetic field, such changes being sensitive to a moisture level. The styling tool may include a pressure sensor that can detect the pressure of heating plates upon the user's hair. An example of a pressure sensor is an electro-mechanical or haptic pressure sensor as known in the art. The client device 120 is configured to collect information about a user and to provide output to the user. The operating system of the client device can have a user interface that is configured to perform multiple functions. In an aspect, the client device can be in communication with a network and enable the user interface access to the Internet as well as Internet of Things (IOT). As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known. In an example, the network can access a server hosting media, protocols, products, personal accounts, stored usage data, and other data related to the appliance, the brushheads, and skin care.

The user interface can display tutorials on how to use the appliance with the type of brushhead. The user interface can create and download protocols for a regimen or routine. The user interface can coach, track usage and compare the tracked usage to the protocol, the regimen, and the routine.

The user interface can calculate a score based on the tracked usage. The user interface can store the scores and the tracked usage of the styling tool in memory of the client device. The user interface can be used to make a purchase of any products related to the styling tool. For instance, the styling tool may be used with a combination of styling products or chemical compositions used for treating the user's hair or skin, and the client device can output recommendations on particular styling products or compositions to be used, and which step in the process they are to be used, based on the desired results inputted by the user.

As an initial step, the client device collects information regarding a user's desired results. In an example, the user may use the client device to browse a database of images which depict various hair styles and color options. In another example, the user may enter a keyword search to the client device to find a desired look. The client device may store search results locally or may connect to an external system or server to access the database or search results.

After the user finds a desired look to be achieved using the styling tool, the user may access tutorials for using the styling tool to achieve a target look. The tutorials may be in text form, still image form, video form, or audio-only form.

In addition to using the tutorials, the user may connect the client device 120 with the styling tool over the wireless connection (such as the Bluetooth or Wi-Fi connection) to receive real-time feedback while using the styling tool, or to record the usage of the styling tool for later reporting or feedback.

For example, the styling tool can communicate what mode the styling tool is currently in (such as curling, straightening, or waving mode).

For example, while using the styling tool, the motion sensor on the styling tool can output a detection motion of the styling tool as feedback to the client device. The client device is configured to compare the detected motion with predetermined motion data for providing real-time performance results to the user to or to output instructions for the user to make a correction.

In another example, the temperature sensor on the styling tool can detect a temperature and communicate temperature information to the client device. The client device is configured to compare the detected temperature with predetermined temperature information for providing a warning to the user when the detected temperature is above a predetermined threshold. In an example, a timer on the styling tool may provide measured time information to the client device. The client device is configured to compare the measured time to a target time for providing an output to the user on the amount of time remaining for a certain action using the styling tool, or to provide a warning to the user when a time target has elapsed. The target time may depend on the routine, the style to be achieved, and the current step in the process such that there may be different durations for the different steps. The client device is configured to receive input from the user to create a customer profile based on the personal characteristics of the user. For instance, the client device is configured to provide questions to the user such as "hair dyed or not?", "hair thick or thin?", and "hair straight or curly?". The customer profile can be used to select a specific tutorial or set of data to be used when measuring the performance from the styling tool. The client device may avoid recommending or proposing certain hair styles depending on the assessed type of hair, level of damage, or other parameters.

The client device can also have a camera function that can be used to provide inputs to the customer profile. For instance, the camera can take images of the user's hair or skin to determine if a desired look is possible, or to make further recommendations to the user based on the characteristics or color of the hair or skin.

Alternatively, the client device can interface with known spectrography tools to analyze the user's hair or skin. Alternatively, the client device can interface with known chemical measuring tools to determine the chemical and structural properties of the user's hair. In an embodiment, the client device is configured to maximize personalization and safety for the user. The client device may warn a user of the styling tool is not recommended for the type of hair of the user. The client device may inquire if the user's hair is color-treated (including bleached), highlighted, keratin-treated or relaxed.

The client device may receive as an input the level of moisture or porosity or the hair (which may be assess by the stylist, or by the moisture sensor on the styling tool).

The client device may provide a warning if the hair is not ready to receive heat, such as if the moisture sensor detects too much wetness.

The client device may provide instructions to pre-treat the user's hair before applying heat. The client device may advise if the initial temperature is right for the style the user is trying to achieve since different levels of temperatures are suitable for different hair quality levels.

The client device can have an automated setup or control, such as providing automated temperature control from the client device from the phone.

The client device is configured to upload data regarding the user to an external system or server (such as a cloud-based system). Such data may include the user profile, amount of use of the styling tool, or performance results when using the styling tool. The client device can also provide an option to keep the user data anonymous.

The client device can use the camera function to provide a sharing feature, in which the user can upload photos taken before and/or after the use of the styling tool. The uploaded photos can be used for receiving feedback from professional hair stylists or other users. In an embodiment, the uploaded photos may be uploaded directly to a social media platform.

Figure 3:
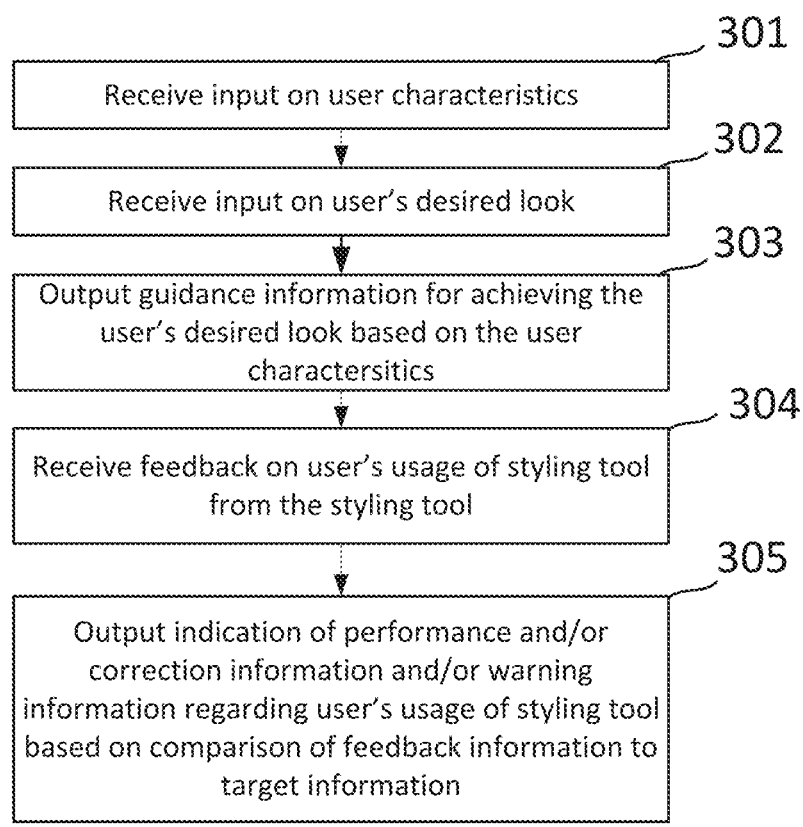
FIG. 3 depicts a method performed by the client device according to an embodiment.

FIG. 3 shows a flowchart of a method performed by the client device based on the above-described features. In step 301, the client device receives an input from the user regarding the user's physical characteristics. In step 302, the client device receives an input from the user regarding a selection of a desired look to be achieved using the styling tool. In step 303, the client device outputs guidance information for achieving the user's desired look using the styling tool based on the user's selection and the user's physical characteristics. In step 304, after the user starts using the styling tool, the client device receives feedback on the user's usage of the styling tool from the styling tool (such as feedback from the various sensors incorporated into the styling tool and described above). In step 305, the client device outputs an indication of the user's performance based on a comparison of the feedback information received from the styling tool and target information. Alternatively, the client device may output correction information (such as an adjustment of a movement of the styling tool or heat setting) based on the feedback information. Alternatively, the client device may output warning information (such as a warning related to a sensed temperature, moisture, or time elapsed) to the user based on the feedback information.

(FIThe principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A system, comprising:
a styling tool that includes an iron and is configured to treat or shape a user's hair by applying heat from the iron to the user's hair, the styling tool comprising a pressure sensor and a temperature sensor;
a client device remote from the styling tool configured to communicate with the styling tool such that the pressure sensor and temperature sensor transmit sensed conditions to the client device during use,
wherein the client device is configured to initially receive input information from the user regarding a desired result to be achieved using the styling tool, and is further configured to output guidance information to the user to use the styling tool in order to achieve the desired result, including by providing correction information based on feedback generated from the sensed conditions of the styling tool during use.

2. The system according to claim 1, wherein the guidance information is image data, video data, or audio data on using the styling tool to achieve the desired result.

3. The system according to claim 1, wherein the input information received from the user is a selection of an image from a database.

4. The system according to claim 1, wherein the client device is configured to receive user information regarding physical characteristics of the user and output the guidance information based on the received user information.

5. The system according to claim 4, wherein the client device is configured to output an indicator to prevent the user from selecting a desired result or output a warning to the user when the received user information is determined to be incompatible with the desired result.

6. The system according to claim 4, wherein the client device is configured to interface with a device that is configured to measure the chemical and structural properties of the hair of the user in order to assist in generating the user information.

7. The system according to claim 1, wherein the styling tool includes a motion sensor configured to track a motion of the styling tool during use of the styling tool, the styling tool is configured transmit the motion information regarding the motion of the styling tool to the client device.

8. The system according to claim 7, wherein the client device is configured to output the motion information to the user during usage of the styling tool and to output an indication on whether there is a difference between the sensed motion of the styling tool and a required motion to achieve the desired result.

9. The system according to claim 1, wherein the styling tool includes a moisture sensor configured to detect moisture in the user's hair prior to or during user of the styling tool, the styling tool being configured to transmit moisture information regarding the detected moisture to the client device.

10. The system according to claim 9, wherein the client device is configured to output an indication or warning information to the user that moisture is detected in the user's hair prior to the user applying heat to the user's hair when using the styling tool.

11. The system according to claim 1, wherein the styling tool includes a timer configured to measure an amount of time that the styling tool is being used upon the user's hair and to transmit time information regarding the measured amount of time to the client device.

12. The system according to claim 11, wherein the client device is configured to output an indication of the measured amount of time relative to a target time to the user.

13. The system according to claim 1, wherein the client device is configured to communicate with the styling tool via wireless communication.

14. A method comprising:
providing a user with a hair styling tool having a pressure sensor and a temperature sensor;
providing a client device remote from the hair styling tool, the client device configured to communicate with both the user and the hair styling tool;
inputting into the client device a desired result to be achieved by the user using the hair styling tool; the client device configured to generate guidance information for achieving the desired result and providing it to the user;
treating or shaping the user's hair using the styling tool;
transmitting, by the styling tool, feedback to the client device regarding sensed conditions of the styling tool during use, and based on the sensed conditions, the client device provides corrective feedback to the user in order for the user to achieve the desired result with the hair styling tool.

15. A styling tool, comprising:
an iron configured to apply heat to a user's hair;
circuitry configured to generate styling tool user information responsive to one or more user inputs; and
circuitry configured to exchange styling tool control and operation information with a client device based on the styling tool user information,
wherein the client device is configured to receive input information from the user regarding a desired result to be achieved using the styling tool, and to output guidance information on a method of using the styling tool to achieve the desired result,
wherein the input information received from the user is a selection of an image from a database.

16. The styling tool of claim 15, further comprising:
circuitry configured to exchange encrypted and anonymized styling tool user information with a client device.

17. The styling tool of claim 15, further comprising:
circuitry configured to exchange styling look information with a remote network; and
circuitry configured to generate styling tool control and operation information based on the styling look information.

18. The styling tool of claim 15, further comprising:
circuitry configured to generate a virtual representation of styling tool control and operation information on a virtual display.

19. The styling tool of claim 15, further comprising:
circuitry configured to receive one or more user inputs associated with a target styling look; and
circuitry configured to generate a virtual representation of styling tool control and operation information on a virtual display based on the one or more user inputs associated with the target styling look.

20. The styling tool of claim 15, further comprising:
circuitry configured to generate a haptic instruction associated with control and operation of the styling tool based on the one or more user inputs associated with the target styling look.

* * * * *